Patented July 29, 1952

2,605,207

UNITED STATES PATENT OFFICE 2,605,207

INSECT REPELLENTS

Nathan L. Drake, College Heights, Md., Charles M. Eaker, Affton, Mo., and Wilbur J. Shenk, Cleveland, Ohio, assignors to the United States of America as represented by the Secretary of the Army No Drawing. Application January 11, 1949, Serial No. 70,397

8 Claims. (Cl. 167—30)

This invention relates to insect repellents.

We have found that the application of certain esters of the general formula

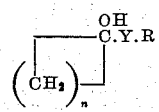

wherein $n$ is 4 or 5, Y is —COO— or —CH$_2$COO—, and R is an alicyclic or an unsubstituted or substituted aliphatic radical preferably having at least 3 carbon atoms, when applied to the human skin or to a fabric, effectively repels insects, particularly Aëdes aegypti and Anopheles quadrimaculatus.

Thus, suitable acids whose esters are insect repellent, are 1-hydroxy-cyclopentanecarboxylic acid, 1-hydroxy-cyclopentaneacetic acid, 1-hydroxy-cyclohexanecarboxylic acid, and 1-hydroxy-cyclohexaneacetic acid; among suitable alcohol radicals of our esters are for example alkyl such as ethyl, propyl, butyl, iso-amyl; ketonyl such as acetonyl; ethoxyalkyl such as ethoxyethyl; and cycloalkyl such as cyclopentyl and cyclohexyl.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

The following table illustrates the results obtained by the above test methods against Aëdes aegypti and Anopheles quadrimaculatus, as examples of insects against which the invention is applicable, by using compounds in accordance with the present invention:

| Material | Insect Repellency upon application to skin— | | Insect Repellency of impregnated fabric against |
|---|---|---|---|
| | Aëdes aegypti | Anopheles quadrimaculatus | Aëdes aegypti |
| a. ESTERS OF 1-HYDROXY-CYCLOPENTANE-CARBOXYLIC ACID | | | |
| | Mins. | Mins. | |
| propyl ester | over 60 | | |
| i-amyl ester | over 120 | | |
| cyclopentyl ester | 237 | 66 | |
| cyclohexyl ester | 236 | 39 | over 10 days. |
| b. ESTERS OF 1-HYDROXY-CYCLOPENTANE-ACETIC ACID | | | |
| cyclohexyl ester | 330 | 50 | over 10 days. |
| c. ESTERS OF 1-HYDROXY-CYCLOHEXANE-CARBOXYLIC ACID | | | |
| propyl ester | over 60 | | |
| butyl ester | over 60 | | |
| i-amyl ester | 194 | 35 | over 5 days. |
| ethoxyethyl ester | 227 | 43 | over 10 days. |
| acetonyl ester | 255 | 46 | Do. |
| cyclohexyl ester | 258 | 78 | Do. |
| d. ESTERS OF 1-HYDROXY-CYCLOHEXANE-ACETIC ACID | | | |
| ethyl ester | 244 | 32 | over 10 days. |
| propyl ester | 238 | 41 | at least 1 day. |
| butyl ester | 255 | 46 | over 10 days. |
| i-amyl ester | 212 | 40 | Do. |
| cyclopentyl ester | 271 | 39 | Do. |
| cyclohexyl ester | 330 | 50 | |

The esters of 1-hydroxy-cyclopentane- or cyclohexanecarboxylic or -acetic acids may be prepared by either of the following two type reactions:

A. Cyclopentanone or cyclohexanone+HCN or NaCN hydrolysis→ 1-hydroxy-cyclopentane-carboxylic acid or 1-hydroxy-cyclohexane-carboxylic acid + alcohol $\xrightarrow[\text{catalyst}]{\text{benzene}}$ ester of 1-hydroxy-cyclopentane carboxylic acid or 1-hydroxy-cyclohexanecarboxylic acid.

B. By a Reformatsky reaction between cyclopentanone or cyclohexanone and an ester of bromo-acetic acid in the presence of zinc, benzene, and optionally a catalyst such as toluenesulfonic acid; followed by the introduction of the hydroxyl group in the 1-position by reacting the product of the Reformatsky reaction with diluted sulfuric or hydrochloric acid.

The following examples illustrate the preparation of several typical compounds enumerated in the above table:

Example 1

A solution of 450 gms. of sodium bisulfite in 900 cc. of water is cooled to 10° C., and 344 gms. (about 4 mols) of cyclopentanone are added slowly and at a rate which does not permit the temperature to rise above 15° C. The mixture is again cooled to 10° C. and 200 gms. of cold sodium cyanide in 800 cc. of water are added slowly, care being taken that the temperature does not substantially rise above 10° C. The mixture is then permitted to rise to 20° C. over a period of 2 hours. Two layers, one of which contains cyanohydrin, form and are separated. 800 cc. of concentrated hydrochloric acid are then added to the cyanohydrin containing layer and the mixture is moderately heated in a steam bath overnight, then filtered. The residue is triturated three successive times with ether. The resulting layers are separated and the aqueous layer is alkalized to throw out the acid and extracted with ether. The ether layers are combined, 200 cc. of benzene are added, and the solution is shaken with 150 gms. of magnesium sulfate. The solvent is removed on a steam cone, and the reaction product is permitted to crystallize. The yield is 185 gms. of dry crystals of 1-hydroxy-cyclopentanecarboxylic acid.

22 gms. of the 1-hydroxy-cyclopentanecarboxylic acid obtained by the above reaction are reacted with 31 gms. of cyclopentanol in the presence of 90 gms. of benzene and 1.5 gms. of toluenesulfonic acid catalyst. The reaction mixture is heated under reflux for 6 hours and the cyclopentyl ester of 1-hydroxy-cyclopentanecarboxylic acid is obtained as the reaction product.

Example 2

22 gms. of 1-hydroxy-cyclopentanecarboxylic acid obtained in accordance with the first paragraph of Example 1 and reacted with 40 gms. of cyclohexanol in the presence of 90 gms. of benzene and 3 gms. of toluenesulfonic acid catalyst. The reaction mixture is heated under reflux for 5 hours. The yield is 27 gms. of the cyclohexyl ester of 1-hydroxy cyclohexanecarboxylic acid, a liquid boiling at 97–98° C. at .5 mm. pressure.

Example 3

147 gms. of cyclohexanone, 1500 cc. of ether and 1129 gms. of sodium cyanide are placed in a 3 liter flask with good stirring. The mixture is cooled to 0° C., and 200 cc. of concentrated hydrochloric acid, 35%, are added over a period of 5 hours, corresponding to a rate of addition of about 25 drops per minute. The liquid is decanted, and the ether is taken off by heating on a steam cone under reduced pressure. The residue remaining after the removal of the ether is dissolved in 300 cc. of concentrated hydrochloric acid and placed on a steam cone in a 1 liter Erlenmeyer flask and heated overnight. The resulting ammonium chloride layer is separated, and the remainder is cooled and the reaction product, 1-hydroxy-cyclohexanecarboxylic acid, is permitted to crystallize. The system is then filtered and the residue extracted with ether which is then removed and additional crystals are crystallized with the aid of benzene. The resulting yield is 100 gms. of white crystals of 1-hydroxy-cyclohexanecarboxylic acid. The above synthesis is based on a synthesis described by Bucherer in Berichte, vol. 27, page 1231 (1894).

23 gms. of 1-hydroxy cyclohexanecarboxylic acid obtained by the above reaction are added to 35 gms. of iso-amyl alcohol, 2 gms. of toluenesulfonic acid, and 100 gms. of benzene. The reaction mixture is heated with refluxing for 6 hours. 24 gms. of the iso-amyl esters of 1-hydroxy-cyclohexanecarboxylic acid, a liquid boiling at 89–90° C. at .5 mm. pressure, are obtained.

Example 4

Cyclohexanone and ethyl bromoacetate are reacted under standard conditions of the Reformatsky reaction (see Berichte, vol. 28, p. 2839) in the presence of zinc and benzene. The resulting intermediate organo-metallic product is treated with diluted sulfuric acid. The resulting product, the ethyl ester of 1-hydroxy-cyclohexaneacetic acid, is separated by distillation and is obtained in the form of a liquid having a boiling point of 87–88° C. at 2 mm. pressure, with a refractive index of $n_D^{21.3} = 1.4650$.

For ease of application the compounds contemplated by the present invention may be incorporated in a suitable inert liquid or solid carrier such as mineral oil, alcohol, petrolatum, etc. For facile and uniform fabric impregnation, they may be applied in an inert solvent, such as alcohol, ether, etc.

Having thus described our invention, we claim:

1. An insect repellent composition comprising a member of the group consisting of the cyclohexyl ester of 1-hydroxy-cyclopentaneacetic acid, the cyclohexyl ester of 1-hydroxy-cyclohexanecarboxylic acid, the cyclopentyl ester of 1-hydroxy-cyclohexaneacetic acid, and the cyclohexyl ester of 1-hydroxy-cyclohexaneacetic acid; and a non-toxic insect-repellent adjuvant as a carrier therefor.

2. An insect repellent composition comprising the cyclohexyl ester of 1-hydroxy-cyclopentaneacetic acid, and a non-toxic insect-repellent adjuvant as a carrier therefor.

3. An insect repellent composition comprising the cyclohexyl ester of 1-hydroxy-cyclohexanecarboxylic acid, and a non-toxic insect-repellent adjuvant as a carrier therefor.

4. An insect repellent composition comprising the cyclopentyl ester of 1-hydroxy-cyclohexaneacetic acid, and a non-toxic insect-repellent adjuvant as a carrier therefor.

5. An insect repellent composition comprising the cyclohexyl ester of 1-hydroxy-cyclohexaneacetic acid, and a non-toxic insect-repellent adjuvant as a carrier therefor.

6. An insect repellent fabric comprising a fabric impregnated with the cyclohexyl ester of 1-hydroxy-cyclopentaneacetic acid.

7. An insect repellent fabric comprising a fabric impregnated with the cyclohexyl ester of 1-hydroxy-cyclohexanecarboxylic acid.

8. An insect repellent fabric comprising a fabric impregnated with the cyclopentyl ester of 1-hydroxy-cyclohexane-acetic acid.

NATHAN L. DRAKE.
CHARLES M. EAKER.
WILBUR J. SHENK.

(References on following page)

REFERENCES CITED

The following references are of record in the file of this patent:

UNITED STATES PATENTS

| Number | Name | Date |
|---|---|---|
| 2,352,746 | Wasum | July 4, 1944 |
| 2,396,012 | Jones et al. | Mar. 5, 1946 |
| 2,396,013 | Jones et al. | Mar. 5, 1946 |
| 2,400,006 | Jones et al. | May 7, 1946 |

OTHER REFERENCES

Kon et al.: Dehydration of Beta-Hydroxy Esters, 1932, Chemical Abstracts, vol. 26, pages 5908 and 5909.

OSRD—Insect Control Committee Report No. 16, Interim Report No. 0-87, February 1, 1945. Publication date August 1, 1947. 167–OSRD.

Newman et al.: J. A. C. S., vol. 68, October 1946, pages 2112–2115. 167–12.

Tarbouriech et al.: Comptes Rendus, vol. 149, pages 604–606 (1909). (Copy in Patent Office Scientific Library.)

McRae et al.: Syntheses of Succinic Acid, 1943, Chemical Abstracts, vol. 37, pages 4056 and 4057.